United States Patent [19]

Kimura

[11] 4,386,944
[45] Jun. 7, 1983

[54] SYSTEM AND PROCESS FOR INCREASING THE COMBUSTIBLE COMPONENT CONTENT OF A GASEOUS MIXTURE

[75] Inventor: Shiro G. Kimura, Schenectady, N.Y.

[73] Assignee: General Electric Company, Schenectady, N.Y.

[21] Appl. No.: 368,948

[22] Filed: Apr. 16, 1982

Related U.S. Application Data

[63] Continuation of Ser. No. 171,908, Jul. 24, 1980, abandoned, which is a continuation of Ser. No. 592, Jan. 2, 1979, abandoned.

[51] Int. Cl.³ .............................................. B01D 53/22
[52] U.S. Cl. .......................................... 55/16; 55/158; 55/195
[58] Field of Search ................... 55/16, 55, 68, 158, 55/189, 195; 210/195.2

[56] References Cited

U.S. PATENT DOCUMENTS

| | | | |
|---|---|---|---|
| 2,494,554 | 1/1950 | Harlow | 55/16 X |
| 2,497,898 | 2/1950 | McGurl | 55/16 X |
| 2,617,493 | 11/1952 | Jones | 55/16 |
| 3,303,105 | 2/1967 | Konikoff et al. | 55/16 X |
| 3,350,844 | 11/1967 | Robb | 55/16 |
| 3,370,636 | 2/1968 | Francis, Jr. et al. | 55/32 X |
| 3,396,510 | 8/1968 | Ward et al. | 55/16 |
| 3,489,144 | 1/1970 | Dibelius et al. | 55/158 X |
| 3,534,528 | 10/1970 | Porter | 55/16 |
| 3,616,607 | 11/1971 | Klass et al. | 55/16 |
| 3,713,271 | 1/1973 | Franz et al. | 55/16 |
| 3,739,553 | 6/1973 | Aine | 55/158 |
| 3,895,927 | 7/1975 | Bournham, Sr. | 55/189 X |
| 3,903,694 | 9/1975 | Aine | 55/158 X |
| 4,044,696 | 8/1977 | Marincek | 210/774 |
| 4,069,155 | 1/1978 | Tsujimoto et al. | 210/195.2 |
| 4,155,793 | 5/1979 | Salemme et al. | 156/246 |
| 4,171,017 | 10/1979 | Klass | 55/16 X |

Primary Examiner—Robert H. Spitzer
Attorney, Agent, or Firm—Lawrence D. Cutter; James C. Davis, Jr.; Marvin Snyder

[57] ABSTRACT

A system and process are described for increasing the concentration of a combustible component of a gaseous mixture containing such component (e.g. methane) and an additional gaseous component (e.g. carbon dioxide), wherein the gaseous mixture is contacted with a permselective membrane which is permeable to both such components and has selectivity for the additional component. A pressure difference is maintained across the membrane. At least a portion of the energy employed to maintain the pressure difference is provided by combustion of at least a portion of the combustible component which has permeated through the membrane.

10 Claims, 1 Drawing Figure

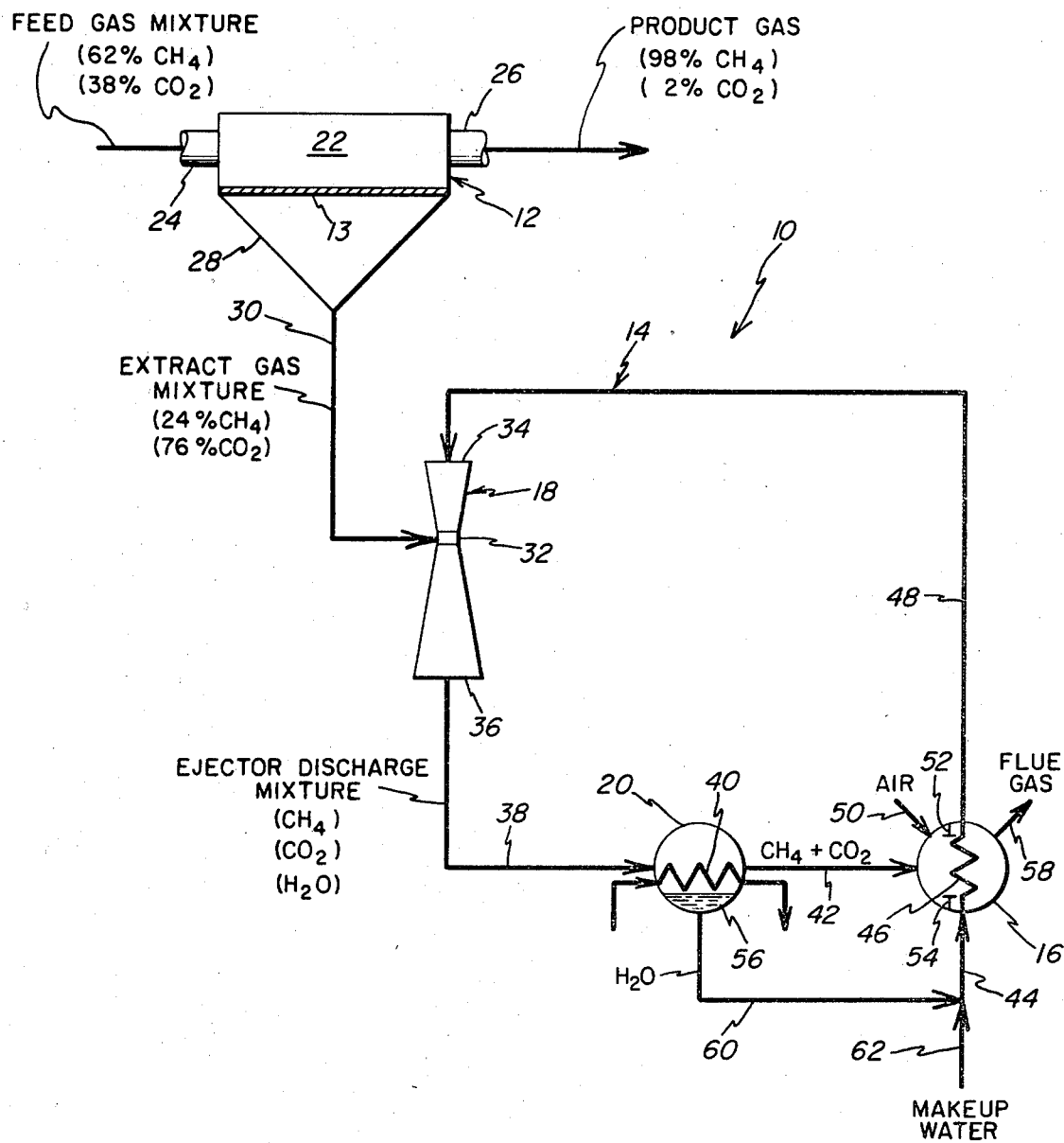

SYSTEM AND PROCESS FOR INCREASING THE COMBUSTIBLE COMPONENT CONTENT OF A GASEOUS MIXTURE

This is a continuation of application Ser. No. 171,908, filed July 24, 1980, now abandoned, which is a continuation of application Ser. No. 000,592, filed Jan. 2, 1979, and now abandoned.

BACKGROUND OF THE INVENTION

This invention relates to a system and process for increasing the combustible component content of a gaseous mixture containing such component, e.g. increasing the methane content of sewage digester gas containing methane and carbon dioxide.

Sewage digester gas (SDG), i.e. the gaseous product of digestion of sewage, includes principally methane ($CH_4$) and carbon dioxide ($CO_2$), in relatively high and relatively low concentrations, respectively. Methane (the major component of natural gas) per se has a relatively high fuel value, i.e. a high BTU release upon combustion. However, $CO_2$ is noncombustible and its presence lowers the fuel value of SDG. It would be desirable to be able to efficiently and simply decrease the $CO_2$ content and increase the $CH_4$ content of gaseous mixtures including these materials as components, e.g. SDG, thereby increasing the fuel value of the mixture.

It has now been found that the aforesaid desirable ability is provided by the present invention.

DESCRIPTION OF THE INVENTION

Generally stated, in one aspect, this invention provides a process for increasing the content of a combustible gaseous component (e.g. $CH_4$) of a gaseous mixture containing at least one additional gaseous component (e.g. $CO_2$). The mixture is contacted with a major surface of a permselective membrane which is permeable to both these components but has a selectivity of greater than 1.0 for the additional component at the temperature of the contacting mixture. A pressure difference is developed across the membrane and maintained during the period of membrane-mixture contacting. The higher pressure is the external pressure on the mixture-contacting side or surface. Under such driving force (the pressure difference) the additional component preferentially permeates through the membrane such that the mixture being contacted becomes relatively depleted in the additional component and relatively enriched in the combustible component. That is, higher fuel value product gas is formed on the higher pressure side of the membrane. On the opposite or lower pressure side there is formed an additional or extract gaseous mixture which is relatively lean in the combustible component and relatively rich in the additional component.

A novel feature and major advantage of this invention is that at least a portion of the energy employed to develop and maintain the pressure difference is provided by combustion of the combustible component in the lower pressure mixture.

In a preferred embodiment, no external source of energy is required to develop and maintain the driving force for the preferential enrichment of the initial gaseous mixture in the combustible component.

In another aspect of this invention, generally stated, there is provided a system suitable for performing the process of the invention.

BRIEF DESCRIPTION OF THE DRAWING

Practice of this invention will be more fully understood by referring to the following detailed description taken with the accompanying drawing, which illustrates the best mode contemplated for carrying out the invention.

In the drawing, wherein like numerals identify similar elements throughout:

FIG. 1 is a flow sheet schematically illustrating the process and system of this invention as applied to SDG.

DETAILED DESCRIPTION OF THE INVENTION AND MANNER AND PROCESS OF MAKING AND USING IT

Referring now to the drawing there is illustrated enrichment system 10 for combustible enrichment, i.e. for increasing the content or percent concentration of a combustible component (e.g. $CH_4$), of a gaseous mixture containing such component and at least one additional component (e.g. $CO_2$). The system includes membrane chamber 12 containing membrane 13 through which the additional component preferentially permeates (relative to permeation therethrough by the combustible component) under a suitable pressure difference maintained across the thickness of the membrane.

Although the present invention is applicable to any gaseous mixture of any combustible component and at least one additional component (provided the mixture and the components satisfy the provisions set forth hereinbelow), the combustible component and the requisite additional component are hereinafter referred to, for simplicity, as methane ($CH_4$) and carbon dioxide ($CO_2$), respectively.

System 10 further includes fluid flow circuit 14 in flow communication with a portion of membrane chamber 12 in a manner described below. Circuit 14 includes boiler 16 wherein vaporizable liquid (e.g. water) supplied thereto is vaporized under pressure to form pressurized vapor (e.g. superatmospheric-pressure steam), which serves as motive- or driving-fluid for ejector 18 (also included in the circuit). The motive fluid is passed through ejector 18 to develop and maintain the permeation-assisting pressure difference across the membrane by creating suction on a low-pressure or extract side of the membrane.

The motive-fluid flow discharged from the ejector contains $CH_4$ drawn from the extract side of the membrane. This $CH_4$-containing discharge flow is passed to the boiler, preferably via condenser 20 wherein at least a portion of the motive fluid is condensed and separated. At least a portion of the processed $CH_4$ is combusted in the boiler, the combustion providing heat energy for vaporizing the liquid motive fluid in the boiler.

The foregoing overview will provide perspective for the following description in greater detail of the illustrated $CH_4$-enrichment system and process.

Membrane chamber 12 includes pressure compartment 22 for confining the gaseous mixture (e.g. SDG) being enriched in $CH_4$ to contact such raw or feed gas with a major surface of permselective membrane 13. The feed gas preferably flows into the pressure compartment, as through inlet pipe 24, the flow being conducted along and in contact with the membrane surface exposed thereto, the resulting $CH_4$-enriched and $CO_2$-depleted gaseous mixture or product gas exiting the pressure compartment via outlet pipe 26. The membrane has at least a minor permeability (e.g., $Pr_c$ of at least 1.0 Pr-unit) to $CH_4$. As used herein, "Pr-unit" means:

$$1\left[\frac{CC\ (STP)\ \times\ \text{cm (membrane thickness)}}{\text{sec.}\ \times\ \text{cm}^2\ \text{(membrane area)}\ \times\ \text{cm Hg (transmembrane pressure difference)}}\right],$$

wherein "STP" means at standard temperature and pressure, (i.e. 23° C. and 76 cm Hg). The membrane also has a selectivity, $\alpha$ of greater than 1.0 at the temperature of the feed gas, where "$\alpha$" means the permeability ratio ($Pr_a/Pr_c$) and $Pr_c$ and $Pr_a$ are the permeabilities in Pr-units of the combustible component (e.g. $CH_4$) and the additional component (e.g. $CO_2$), respectively. The selectivity is preferably from about 10 to about 100 or more. Although membranes having selectivities above 100 may be employed in this invention, the amount of pressure-difference energy obtainable from combustion of $CH_4$ permeated through the membrane is expected to be too low to justify the initial and operating costs of circuit 14 or other $CH_4$-combustion-fired means for developing and maintaining the requisite transmembrane pressure difference.

The feed gas may be at any suitable pressure and temperature, provided that the transmembrane pressure difference does not exceed the rupture strength of the membrane at such temperature.

Membrane chamber 12 further includes low-pressure compartment 28, one side of which is defined by the major surface of membrane 13 opposite the major surface contacted by the feed gas. Compartment 28 is in flow communication, via flow conduit or pipe 30, with suction chamber 32 of ejector 18 which is powered in well-known manner by flow therethrough of superatmospheric steam (or other motive fluid) admitted thereto through inlet 34 thereof. The inlet motive fluid may be at any suitable pressure, e.g. from about 5 to about 200 psig or more.

The suction developed by the ejector is applied via pipe 30 and compartment 28 to the aforesaid opposite surface of the membrane, thereby developing and maintaining a pressure difference ($\Delta P$) across the membrane of $P_m - P_o > 0$, preferably at least 5 psi (controllable by modifying the flow rate of the motive fluid), wherein $P_m$ and $P_o$ are the external pressures on the feed-gas contacted surface and on the opposite surface thereof, respectively. This $\Delta P$ aids in effecting the requisite preferential permeation of the membrane by $CO_2$ in the feed gas mixture. Such preferential permeation (including at least minor permeation by the $CH_4$ therein) effects formation, adjacent the feed-contacted membrane surface, of product gas which is enriched in $CH_4$ and at least partially depleted in $CO_2$. That is, relative to the concentration of $CH_4$ and $CO_2$ in the feed gas, the feed gas is relatively rich in $CH_4$ and relatively lean in $CO_2$. Concurrently, there is formed (adjacent the opposite surface) an extract gaseous mixture relatively lean in $CH_4$ and relatively rich in $CO_2$ (that is, relative to the feed gas).

Suitable structures for the membrane chamber and the ejector are shown in U.S. Pat. No. 3,396,510 (Robb et al.) and No. 4,069,155 (Tsujimoto et al), respectively. These patents are incorporated herein by reference.

The flow discharged from the ejector through outlet 36 thereof includes the motive-fluid flow admixed with the extract mixture drawn into the ejector. This $CH_4$-containing discharge flow is passed via circuit leg or conduit 38 to the separator-condenser 20, wherein preferably at least a substantial portion (e.g. 90% or more) of the motive fluid is separated, as liquid condensate, from the ejected extract mixture (containing $CH_4$ and $CO_2$). Condensation is preferably effected by way of flowing a coolant, e.g. water, through condenser cooling element 40, which may be, e.g. a coiled tube, a bank of tubes, or the like.

The condenser-treated gaseous extract mixture, preferably containing not more than a minor amount (e.g. up to about 10%) of the motive fluid, flows through circuit leg or conduit 42 into the vapor space of boiler 16, into which air is supplied via inlet line 50. Ignition means illustrated by electrodes 52 and 54 ignites the resulting boiler-contained mixture containing air and $CH_4$ to effect combustion thereof. Liquid motive fluid, e.g. water, is supplied via conduit 44 to heat-transfer element 46 (e.g. hollow copper tube) through which at least a portion of the heat generated by the $CH_4$ combustion is transferred to the element-contained liquid in an amount sufficient to vaporize the liquid and elevate its pressure (i.e. pressurized vapor is formed).

The pressurized vapor flows under the pressure (e.g. 100 psig) thereof through circuit leg or conduit 48 and enters the ejector as described above. The combustion products or boiler flue gas leaves the boiler via outlet 52.

Condensed motive fluid 54 (e.g. liquid water) is preferably recycled to the boiler via conduit 56. Make-up motive fluid (e.g. liquid water) can be supplied via extension leg 58 of conduit 44, as where condensate 54 is removed and recovered from the ejector discharge flow in an amount insufficient to provide the demand for vaporized motive fluid.

The various components of the system are either commercially available elements or can be made using well known methods therefor. The system can be made by well-known procedures for assembling such elements.

The present process can be carried out using batch, continuous or semi-continuous addition of the feed gas mixture to the feed gas/membrane contacting compartment. Continuous addition is preferred. The membrane may have any suitable configuration, e.g. flat sheet, tubular, hollow fiber, or spiral. The feed gas mixture can be supplied at any suitable pressure and any suitable temperature. Suitable pressure includes, for example, from about 14.7 or less to about 100 or more psia, while suitable temperature includes for example from about 20° C. or less to about 60° C. or more. The pressure on the suction side of the membrane is preferably from about zero to about 14.7 psia (subject to the transmembrane $\Delta P$ set forth above).

In a preferred embodiment of the process, SDG is enriched in $CH_4$, the SDG feed gas mixture, the product gas mixture, and the extract gas mixture having the approximate amounts of $CH_4$ and $CO_2$ shown in the drawing. The feed gas may be supplied at a rate of about 100,000 scfd (standard cubic feed per day) and be separated into about 48 scfd of product gas and about 52 scfd of extract (per 100 scfd of feed gas). The product gas is high-BTU (i.e. heating value of about 1000 British Thermal Units per scf) and of requisite quality for use in existing natural gas pipeline distribution systems. Steam at about 100 psig is formed at a sufficient rate by vaporizing water in the boiler such that the pressure on the low-pressure side of the membrane is about 3.7 psia. It is expected that the extract steam, having a heating value of about 300 BTU/scf, will be capable of providing, upon combustion, substantially all the thermal energy to generate steam at the aforesaid rate. The preferred membrane in this embodiment is a blend of about 75% poly (2,6-dimethyl phenylene oxide) and about 25% block inter polymer of bisphenol-A carbonate units and dimethylsiloxane units, as described in U.S. patent application Ser. No. 853,087 (Salemme et al.) filed Nov. 21, 1977, and incorporated herein by reference. (The polyphenylene oxide and polycarbonate polymers described therein at, for example, pages 12–15 thereof, are generally suitable compositions from which the membrane employed herein can suitably be formed). When formed with a preferred thickness of 200 Angstroms, approximately 300 or less square feet of such membrane will be required. Although membrane 13 is illustrated as a single flat sheet, a packaged membrane assembly including multiple membrane sheets may advantageously be employed.

BEST MODE CONTEMPLATED

The best mode contemplated for carrying out this invention has been set forth in the description above, for example, by way of setting forth preferred structural arrangements and dimensions, materials of construction, compositions and operating conditions, including but not limited to preferred ranges and values of amounts, temperatures, pressures, and other unobvious variables material to successfully practicing (including making and using) the invention in the best way contemplated at the time of executing this patent application.

It is understood that the foregoing detailed description is given merely by way of illustration and that many modifications may be made therein without departing from the spirit or scope of the present invention.

What is claimed is:

1. A process for increasing the combustible component content of a gaseous mixture, comprising
   (A) contacting a first gaseous mixture comprising a combustible gaseous component and at least one additional gaseous component with a first major surface of a permselective membrane having at least a minor permeability ($Pr_c$) and a selectivity ($Pr_a/Pr_c$) of greater than 1.0 at the temperature of said mixture, wherein $Pr_c$ and $Pr_a$ are the permeabilities of said combustible and said additional components respectively,
   (B) developing and maintaining a pressure difference across said membrane of $P_m - P_o > 0$, wherein $P_m$ and $P_o$ are the external pressures on said first major surface and on the opposite major surface of said membrane respectively, such that said additional component preferentially permeates said membrane to form both (1) a second gaseous mixture relatively rich in said combustible component and relatively lean in said additional component adjacent said first major surface and (2) a third gaseous mixture relatively lean in said combustible component and relatively rich in said additional component adjacent said opposite surface, and
   (C) providing at least a portion of the energy employed to develop and maintain said pressure difference by combusting at least a portion of the combustible component in said third mixture.

2. The process of claim 1, wherein said combustible gaseous component is $CH_4$ and said additional gaseous component is $CO_2$.

3. The process of claim 2, wherein said first gaseous mixture is sewage digester gas.

4. The process of claim 2, wherein said membrane is formed of a polymeric composition comprising a polymer selected from the group consisting of poly(phenylene oxide), sulfonated poly(phenylene oxide), polycarbonate, and mixtures thereof, said selectivity being from about 10 to about 100.

5. A system for increasing the combustible component of a gaseous mixture, comprising:
   housing means for contacting a first gaseous mixture comprising a combustible component and at least one additional gaseous component, with a first major surface of a permselective membrane disposed within said housing so as to define a first and second chamber therein, said membrane having at least a minor permeability, $Pr_c$, and a selectivity, $Pr_a/Pr_c$, of greater than 1.0 at the temperature of said first mixture, wherein $Pr_c$ and $Pr_a$ are the permeabilities of said combustible components and said additional component respectively; and
   means for developing and maintaining a net pressure difference across said membrane of $P_m - P_o > 0$, wherein $P_m$ and $P_o$ are the total external pressures on said first major surface and on the opposite major surface of said membrane, respectively, such that said additional component preferentially permeates said membrane to form both a second gaseous mixture relatively rich in said combustible component and relatively lean in said additional component adjacent said first major membrane surface and in said first chamber and a third gaseous mixture relatively lean in said combustible component and relatively rich in said additional component adjacent said opposite surface and in said second chamber, said pressure developing and maintaining means being powered by combusting at least a portion of the combustible component in said third mixture, whereby combustion products are formed, said housing being configured so that said combustion products are segregated from said first chamber.

6. The apparatus of claim 5, wherein:
   (I) said pressure-difference providing-and-maintaining means includes an ejector, the suction opening thereof being in flow communication with said opposite major surface of said membrane such that suction is applied thereto,
   (II) said energy-providing means includes a fluid flow circuit comprising
   (a) said ejector,
   (b) combustion means for combusting at least a portion of the combustible component contained in said third mixture,
   (c) transfer means for transferring at least a portion of the heat generated by the combustion to a vaporizable liquid supplied to the transfer means to form pressurized vapor,
   (d) first conductor means for conducting said pressurized vapor to the motive-fluid inlet of said ejector, and
   (e) second conductor means for conducting, from the outlet of said ejector to said combustion means, ejector discharge flow containing at least a portion of the combustible component of said third mixture.

7. The system of claim 6, wherein said second conductor means (e) includes removal means for removing from said ejector discharge flow at least a portion of the pressurized vapor or condensate formed therefrom.

8. The system of claim 7, further including means for conducting the removed vapor or condensate to the liquid supply for said transfer means.

9. The system of claim 5, wherein said selectivity of said membrane is for $CO_2$ relative to $CH_4$.

10. The system of claim 9, wherein said membrane is formed of a polymeric composition comprising a polymer selected from the group consisting of poly(phenylene oxide), sulfonated poly(phenylene oxide), polycarbonate, and mixtures thereof.

* * * * *